(12) United States Patent
Xu et al.

(10) Patent No.: US 12,156,778 B2
(45) Date of Patent: Dec. 3, 2024

(54) SELF-LIGATING BRACKET, DOUBLE-WING SPACING ADJUSTABLE BRACKET AND DENTAL APPLIANCE

(71) Applicants: Peking University School of Stomatology, Beijing (CN); Center of Huanzhengduowei Education & Science and Technology, Beijing, Beijing (CN)

(72) Inventors: Tian Min Xu, Beijing (CN); Kai Yuan Xu, Beijing (CN)

(73) Assignees: Peking University School of Stomatology, Haidian (CN); Center of Huanzhengduowei Education & Science and Technology, Beijing, Haidian (CN)

( * ) Notice: Subject to any disclaimer, the term of this patent is extended or adjusted under 35 U.S.C. 154(b) by 17 days.

(21) Appl. No.: 17/944,997

(22) Filed: Sep. 14, 2022

(65) Prior Publication Data

US 2023/0078030 A1    Mar. 16, 2023

(30) Foreign Application Priority Data

Sep. 14, 2021   (CN) .......................... 202111075715.X
Sep. 14, 2021   (CN) .......................... 202122220997.X

(51) Int. Cl.
*A61C 7/14*   (2006.01)

(52) U.S. Cl.
CPC ..................................... *A61C 7/14* (2013.01)

(58) Field of Classification Search
CPC ........... A61C 7/14; A61C 7/285; A61C 7/287; A61C 7/282; A61C 7/34; A61C 7/28; A61C 7/303
See application file for complete search history.

(56) References Cited

U.S. PATENT DOCUMENTS 3,780,437 A  *  12/1973  Wildman ................. A61C 7/12
                                                        433/14
4,386,908 A  *   6/1983  Kurz ....................... A61C 7/12
                                                        433/8

(Continued)

FOREIGN PATENT DOCUMENTS

JP        2013121367 A  *  6/2013  ............... A61C 7/12

OTHER PUBLICATIONS

JP2013121367A (Dentsply Sankin Kk) (Kanomi Tatsuzo; Oki Toshimitsu) Orthodontic Bracket Structure, and Method for Moving the Same, Jun. 20, 2013 [retrieved on Nov. 24, 2023], Translation retrieved from: Espacenet (Year: 2013).*

*Primary Examiner* — Cris L. Rodriguez
*Assistant Examiner* — Courtney N Huynh
(74) *Attorney, Agent, or Firm* — Womble Bond Dickinson (US) LLP

(57) ABSTRACT

A self-ligating bracket, a double-wing spacing adjustable bracket and a dental appliance are described. The self-ligating bracket includes a bracket base plate, a first elastic support, a bracket body, and a position-limited member. A first end of the first elastic support is connected to the bracket base plate. The bracket body has a hollow structure. A second end of the first elastic support is connected to a distal end of the bracket body. The distal end of the bracket body is provided with a distal-end gap. The distal end of the bracket body is expanded radially by the second end of the first elastic support. The position-limited member is movable in an axial direction of the bracket body, and the position-limited member is sleeved on an outside of the bracket body for overcoming elastic force provided by the first elastic support and making the bracket body contract in a radial direction.

9 Claims, 3 Drawing Sheets

(56) References Cited

U.S. PATENT DOCUMENTS

| | | | |
|---|---|---|---|
| 6,682,345 B2* | 1/2004 | Kesling | A61C 7/143 433/8 |
| 2010/0279247 A1* | 11/2010 | Kesling | A61C 7/287 433/10 |
| 2012/0058442 A1* | 3/2012 | Oda | A61C 7/30 264/16 |

* cited by examiner

SELF-LIGATING BRACKET, DOUBLE-WING SPACING ADJUSTABLE BRACKET AND DENTAL APPLIANCE

CROSS-REFERENCE TO RELATED APPLICATIONS

The present application claims priority to Chinese patent applications No. 202111075715.X, filed on Sep. 14, 2021 and entitled "Self-Ligating Bracket, Double-Wing Spacing Adjustable Bracket and Dental Appliance", and No. 202122220997.X, filed on Sep. 14, 2021 and entitled "Self-Ligating Bracket, Double-Wing Spacing Adjustable Bracket and Dental Appliance", which are hereby incorporated by reference in their entirety.

TECHNICAL FIELD

The present disclosure relates to the technical field of dental appliance, in particular to a self-ligating bracket, a double-wing spacing adjustable bracket and a dental appliance.

BACKGROUND

Nowadays, there are two types of dental appliance brackets in domestic and foreign markets: ligating type and self-ligating type. By a ligating bracket, a ligature wire or a ligature ring is used to bind a corrective arch wire in a bracket slot; and by a self-ligating bracket, a cover plate of a slot is used to limit the arch wire in the bracket slot, so there is usually a clearance between the arch wire and the cover plate. The cover plate of the self-ligating bracket has two design types. One is passive, and the cover plate does not actively pressure the arch wire, which is called passive self-ligating bracket; and another is active, and when a size of the arch wire exceeds the minimum limit allowed by the elastic cover plate, the cover plate pressure the arch wire, which is called active self-ligating bracket. Whether the passive self-ligating bracket or the active self-ligating bracket, the clearance between the arch wire and the cover plate is larger than that of the ligating bracket. The larger the clearance, the larger the critical contact angle of an arch wire deformation. Once the angle between the arch wire and the bracket slot is greater than the critical contact angle, the arch wire begins to undergo elastic deformation, and the friction resistance further increases. Therefore, from the mechanical point of view, the friction force of the self-ligating bracket is lower than that of the ligating bracket due to the larger critical contact angle; but on the other hand, the critical contact angle being larger means that the arch wire does not elastically deform when the teeth are slightly uneven, and then the corrective force on the teeth is small, so the control ability of the self-ligating bracket to teeth positions is weaker than the ligating bracket. Self-ligating brackets are used in the early stage of orthodontic treatment due to their low friction and fast removal of crowding. However, when the teeth are relatively aligned in the later stage of orthodontic treatment, the efficiency of precise alignment for the teeth positions is reduced due to the large clearance between the self-ligating bracket and the arch wire. Therefore, the results of modern evidence-based medicine do not support that self-ligating brackets can improve the efficiency of orthodontic treatment Therefore, how to improve the efficiency in every stage of teeth correction is an urgent problem to be solved.

SUMMARY

The present disclosure provides a self-ligating bracket, a double-wing spacing adjustable bracket and a dental appliance to solve the problem of how to improve the efficiency of teeth correction in the related technology.

The self-ligating bracket provided by the present disclosure includes: a bracket base plate; a first elastic support, where a first end of the first elastic support is connected to the bracket base plate; a bracket body, where the bracket body has a hollow structure, a second end of the first elastic support is connected to a distal end of the bracket body, and the distal end of the bracket body is provided with a distal-end gap and the distal end of the bracket body is expanded radially by the second end of the first elastic support; and a position-limited member, where the position-limited member is movable in an axial direction of the bracket body, and the position-limited member is sleeved on an outside of the bracket body for overcoming elastic force provided by the first elastic support and making the bracket body contract in a radial direction.

According to the self-ligating bracket provided by the present disclosure, the bracket body includes a first platform body and a second platform body which are symmetrically and correspondingly arranged. The first platform body and the second platform body are supported and separated from each other by the first elastic support to form a round platform structure, and the distal-end gap is formed between the first platform body and the second platform body.

According to the self-ligating bracket provided by the present disclosure, the position-limited member is a threaded member, the outside of the bracket body is provided with an axial external thread, the threaded member is provided with an internal thread matching with the external thread of the bracket body, and the threaded member is engaged with the bracket body through the internal thread and the external thread.

The self-ligating bracket provided by the present disclosure further includes a second elastic support. A first end of the second elastic support is connected to the bracket base plate, and a second end of the second elastic support is provided to support a mesial end of the bracket body and to separate the first platform body and the second platform body in a radial direction at the mesial end to form a mesial-end gap for insertion of a corrective arch wire.

According to the self-ligating bracket provided by the present disclosure, the first elastic support is a cross structure, the first end of the second elastic support is a splay-shaped structure, and the second end of the second elastic support is a parallel structure.

According to the self-ligating bracket provided by the present disclosure, a cross section of the hollow structure at the mesial end of the bracket body is circular, a cross section of the hollow structure at the distal end of the bracket body is rectangular, and from the mesial end to the distal end of the bracket body, a cross section of the hollow structure has a shape gradually changing from circular to rectangular.

According to the self-ligating bracket provided by the present disclosure, an outer wall of the position-limited member is provided with a first scale mark along a circumferential direction, and/or, an outer wall of the bracket body is provided with a second scale mark along an axial direction.

According to the self-ligating bracket provided by the present disclosure, the position-limited member is a C-shaped structure, and an outer wall of the position-limited member has a rough surface and/or holes for insertion of a needle-like tool.

The present disclosure further provides a double-wing spacing adjustable bracket, including two self-ligating brackets provided by the present disclosure, and the two self-ligating brackets are axially and correspondingly arranged.

The present disclosure further provides a dental appliance, including: a corrective arch wire and a plurality of self-ligating brackets or double-wing spacing adjustable brackets provided by the present disclosure, and the corrective arch wire sequentially passes through the interiors of adjacent bracket bodies.

In the self-ligating bracket provided by the present disclosure, the bracket base plate is used as a support, the bracket base plate and the bracket body are connected to each other through the first elastic support which can provide elastic force on the distal end of the bracket body to form a gap in the radial direction, and the movement of the position-limited member along the axial direction of the bracket body makes the bracket body overcome the elastic force from the elastic supports, and then the bracket body contracts in the radial direction. The self-ligating bracket provided by the present disclosure can realize that a critical contact angle between a labiolingual bracket slot and an arch wire is adjustable through a movement of the position-limited member along the axial direction, and can realize that a size suitable for occlusogingival direction is adjustable by adjusting the bracket body to contract or expand radially through the position-limited member and the first elastic support, an then a clearance between the corrective arch wire and the bracket body can be adjusted accordingly. For example, the clearance can be adjusted to be larger when low friction is required, and be smaller when an accurate control for the teeth position is required. In addition, by using the self-ligating bracket provided by the present disclosure, a defect of frequent replacement of the corrective arch wire can be avoided. Under a guidance of a doctor, a patient can manually adjust the clearance by himself, to meet the needs at different correction stages, reduce the number of patient subsequent visits, improve the correction efficiency and improve the economy.

The present disclosure further provides the double-wing spacing adjustable bracket, which has a bracket structure with adjustable double-wing spacing, and the critical contact angle between the bracket slot and the arch wire is adjustable in a labiolingual direction and a occlusogingival direction. A friction force and a torsion force can be adjusted according to clinical needs to reduce the number of subsequent visits and improve the correction efficiency.

The present disclosure further provides the dental appliance, which includes the self-ligating bracket or the double-wing spacing adjustable bracket, and has the same advantages as above.

BRIEF DESCRIPTION OF DRAWINGS

To more clearly illustrate the solutions of the present disclosure or prior art, accompanying drawings used in the description of the embodiments or the prior art are briefly introduced below. It should be noted that, the drawings in the following description only show some embodiments of the present disclosure. For those of ordinary skill in the art, other drawings may also be obtained according to these drawings without creative effort.

Figure 1:
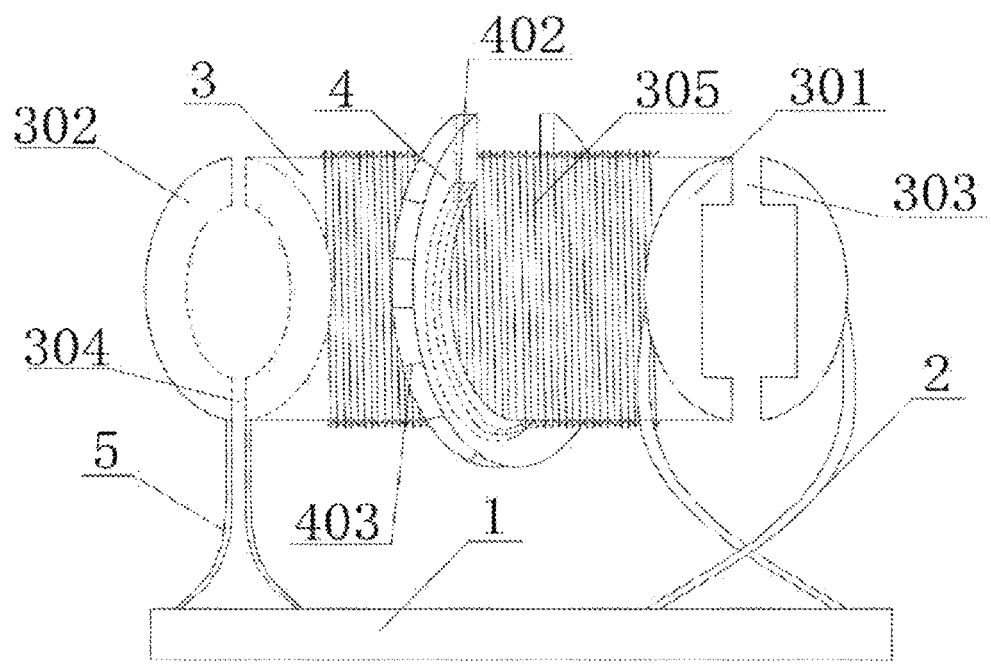
FIG. 1 is a structural view of a self-ligating bracket provided by the present disclosure.

Reference numerals: 1: bracket base plate; 2: first elastic support; 3: bracket body; 301: distal end; 302: mesial end; 4: position-limited member; 5: second elastic support; 311: first platform body; 312: second platform body; and 401: hole; 303: distal-end gap; 304: mesial-end gap; 305 external thread; 402 internal thread; 403 first scale mark.

DETAILED DESCRIPTION OF THE EMBODIMENTS

In order to make the objectives, solutions and advantages of the present disclosure clearer, the solutions of the present disclosure is clearly and completely described in combination with the accompanying drawings of the present disclosure. The embodiments described are a part of the embodiments of the present disclosure, rather than all the embodiments. Based on the embodiments of the present disclosure, all other embodiments obtained by those of ordinary skill in the art without creative effort fall within the scope of protection of the present disclosure.

A self-ligating bracket provided by the present disclosure is described below in combination with FIGS. 1-4. The self-ligating bracket includes a bracket base plate 1, a first elastic support 2, a second elastic support 5, a bracket body 3 and a position-limited member 4.

The bracket base plate 1, as a bottom support of the whole self-ligating bracket, is pasted on teeth.

First ends of the first elastic support 2 and the second elastic support 5 are welded on the bracket base plate 1, and second ends of which are welded on the bracket body 3. The elastic supports can be made of thick nickel-titanium wire, which has a certain elasticity. By using the elastic supports made of elastic material, in a first aspect, it can expand a gap between the bracket bodies 3 and cooperate with the position-limited member 4 to adjust a size of the bracket slot; in a second aspect, when a rigid corrective arch wire is used, such as a stainless steel thick arch wire, the elastic supports contribute to buffering an excessive correction force and transfer part of the correction force to the elastic supports, and then the correction process is soft and continuous; and in a third aspect, when there is a large accidental stress acting on the bracket body 3, for example, when biting a hard food, the elastic supports can provide a certain buffer function to reduce the shedding rate of the bracket.

In an embodiment, the bracket body 3 has a hollow structure, and the second end of the second elastic support 5 is connected to a mesial end 302 of the bracket body 3. The second elastic support 5 expands the mesial end 302 of the bracket body 3 along a radial direction to form a slot size of 0.030±0.003 inches, and the size of the slot should satisfy that the thickest corrective arch wire can be inserted. The second end of the first elastic support 2 is connected to a distal end 301 of the bracket body 3, and the distal end 301 of the bracket body 3 is provided with a distal-end gap 303 and the distal end 301 of the bracket body 3 is expanded radially by the second end of the first elastic support 2. This distal-end gap 303 at the distal end 301 is larger than a mesial-end gap 304 at the mesial end 302. The corrective arch wire can pass through the hollow structure of the bracket body 3 and fixated by an inner wall of the bracket body 3. In an embodiment, a position near the teeth center is defined as the mesial end 302 of the bracket body 3, and a position away from the teeth center is defined as the distal end 301 of the bracket body 3. The distal end 301 of the bracket body 3 is provided with an axial distal-end gap 303, and then the distal end 301 can be opened by a force provided by the first elastic support 2. It should be noted that, for example, driven by the forces from the first elastic support 2 and the second elastic support 5, an outer diameter of the mesial end 302 of the bracket body 3 should be smaller than an outer diameter of the distal end 301 of the bracket body 3, but a clearance exists between the inner wall of the bracket body 3 and the corrective arch wire. In an embodiment, wall thicknesses of the distal end 301 and the mesial end 302 can be adjusted appropriately, and it should be ensured that the position-limited member 4 has a sufficient radial limiting effect on the outer walls of the mesial end 302 and the distal end 301.

The position-limited member 4 is provided to be movable in an axial direction of the bracket body 3, and the position-limited member 4 is sleeved on an outside of the bracket body 3 for overcoming an elastic force provided by the elastic support and making the bracket body 3 contract along a radial direction. A starting position of the position-limited member 4 is located at the mesial end 302 of the bracket body 3, and then the position-limited member 4 gradually moves to the distal end 301. Under the influence of the force of the position-limited member 4, the gap between the two semi-cylindrical brackets gradually narrows, which narrows the clearance between the corrective arch wire and the bracket body 3. It should be noted that in this embodiment, the position-limited member 4 moves along the axial direction of the bracket body 3, to radially limit a position of the bracket body 3 and adjust the clearance between the corrective arch wire and the bracket body 3. In an embodiment, the position-limited member 4 and the bracket body 3 can be connected in a thread manner, and when the position-limited member 4 is rotated, it can move along the axial direction of the bracket body 3.

In the self-ligating bracket provided by the present disclosure, the bracket base plate 1 is used as a support, the bracket base plate 1 and the bracket body 3 are connected through the elastic support which can provide elastic force on the bracket body 3 to expand the bracket body 3 in the radial direction to form a gap at the distal end 301 and the mesial end 302, where the distal-end gap 303 at the distal end 301 is larger than the mesial-end gap 304 at the mesial end 302, and the movement of the position-limited member 4 along the axial direction of the bracket body 3 makes the bracket body 3 overcome the elastic force from the elastic supports, and then the bracket body 3 contracts along the radial direction. The self-ligating bracket provided by the present disclosure can realize that the critical contact angle formed between the bracket slot and the arch wire in a labiolingual direction is adjustable through a movement of the position-limited member 4 along the axial direction, and can realize that a size suitable for occlusogingival direction is adjustable by adjusting the bracket body 3 to contract or expand radially through the position-limited member 4 and the elastic supports, and then the clearance between the corrective arch wire and the bracket body 3 can be adjusted accurately. For example, the clearance can be adjusted to be larger when low friction is required, and be smaller when an accurate control for the teeth position is required. In addition, by using the self-ligating bracket provided by the present disclosure, a defect of frequent replacement of the corrective arch wire can be avoided. Under a guidance of a doctor, a patient can manually adjust the clearance by himself, to meet the needs in different correction stages, reduce a number of patient subsequent visits, improve the correction efficiency and improve the economy.

In one of the embodiments of the present disclosure, the bracket body 3 is composed of a plurality of independent structures which are provided along a circumferential direction, and the gap is provided between two adjacent independent structures. For example, the bracket body 3 includes a first platform body 311 and a second platform body 312 which are symmetrically provided. The first platform body 311 and the second platform body 312 are correspondingly provided, and are supported and separated from each other by the elastic support to form a round platform structure, and the gap is located between the first platform body 311 and the second platform body 312. As shown in FIG. 1, in this embodiment, the first platform body 311 and the second platform body 312 are half-and-half structures, and when they are separated, a round platform structure with an outer diameter at the mesial end 302 smaller than that at the distal end 301 is formed. Where, an initial position of the position-limited member 4 is sleeved at the mesial end 302, and it is ensured that there is a labial mesial-end gap 304 that allows the thickest corrective arch wire to be inserted between the first platform body 311 and the second platform body 312 of the mesial end 302. In this embodiment, the distal end 301 and the mesial end 302 can be designed with equal wall thickness. Then, when the position-limited member 4 is far away from the distal end 301, the outer diameter of the distal end 301 is larger than that of the mesial end 302, which also means that an inner diameter of the distal end 301 is larger than that of the mesial end 302. As the position-limited member 4 moves near the distal end 301, the distal-end gap 303 is continuously tightened, the inner diameter of the distal end 301 is continuously reduced, and the critical contact angle between the corrective arch wire and the inner wall of the bracket body 3 is correspondingly reduced, and then the control ability for teeth position becomes stronger and stronger. When the position-limited member 4 moves to the distal end 301, the distal end 301 and the mesial end 302 of the bracket body 3 have the same diameter, and the bracket body 3 is a cylindrical structure at this time.

In one of the embodiments of the present disclosure, the position-limited member 4 is a threaded member, the outside of the bracket body 3 is provided with an axial external thread 305, the threaded member is provided with an internal thread 402 matching with the external thread 305 of the bracket body 3, and the threaded member is engaged with the bracket body 3 through the internal thread 402 and the external thread 305. In this embodiment, the position-limited member 4 and the bracket body 3 are connected by the internal thread 402 and the external thread 305, and when the position-limited member 4 is rotated, it can move along the axial direction of the bracket body 3. It should be noted that there may be a resistance between the thread connection of the position-limited member 4 and the bracket body 3 to avoid a rotation of the position-limited member 4 caused by brushing teeth or a touch of a foreign object. In addition, the position-limited member 4 and the bracket body 3 can also be connected by a plurality of buckle components arranged along the axial direction of the bracket body 3, for example, an inner wall of the position-limited member 4 is provided with concave parts, and the outer wall of the bracket body 3 is provided with convex parts. Through the clamping between the convex parts and the concave parts, an axial positioning of the position-limited member 4 in the bracket body 3 is realized, and the position-limited member 4 also has a radial limiting effect on the bracket body 3.

When a large friction is required, the position-limited member 4 may be rotated toward the distal end 301, then the bracket body 3 is continuously tightened, the critical contact angle between the corrective arch wire and the bracket body 3 is reduced accordingly, and the control ability for teeth position is stronger and stronger. In an embodiment, when the double-wing spacing adjustable bracket structure is used, when the position-limited member 4 moves to the distal end 301, the distance of the two position-limited members 4 is also increased, the critical contact angle between the corrective arch wire and the bracket body 3 is also reduced, and then the angle between the corrective arch wire and the bracket body 3 is more easily to exceed the critical contact angle and then an elastic deformation occurs, thereby increasing the ability of aligning teeth. Conversely, when the friction needs to be reduced, the position-limited member 4 may be rotated toward the mesial end 302, and then the distal end 301 is expanded under the action of the first elastic support 2, to increase the size of the bracket slot, thereby increasing the clearance between the corrective arch wire and the bracket body 3. When both the two position-limited members 4 move to the mesial end 302, the distance of the two position-limited members 4 can be reduced and the critical contact angle is increased.

In one of the embodiments of the present disclosure, the self-ligating bracket further includes the second elastic support 5. The first end of the second elastic support 5 is connected to the bracket base plate 1, and the second end of the second elastic support 5 supports the mesial end 302 of the bracket body 3. The first platform body 311 and the second platform body 312 at the mesial end 302 are separated from each other by the second elastic support 5 to form a mesial-end gap 304 in between, in which a corrective arch wire can be inserted. In this embodiment, the second elastic support 5 is connected between the bracket base plate 1 and the bracket body 3 by welding, which is mainly used to support the mesial end 302. The second elastic support 5 can also be made of elastic materials such as thick nickel-titanium wire. When the corrective arch wire is made of rigid stainless steel wire, the first elastic support 2 and the second elastic support 5 contribute to alleviate the excessive corrective force and transfer part of the correction performance of the corrective arch wire onto the elastic support. It should be noted that the bracket base plate 1, the first elastic support 2 and the second elastic support 5 can be manufactured as a whole, such as an integrated molding process, or be welded as above. The present disclosure is not limited to the connection relationship and manufacturing process of the three.

In one of the embodiments of the present disclosure, a cross section of the hollow structure of the mesial end 302 of the bracket body 3 is circular with a diameter of 0.030±0.003 inches, and a cross section of the hollow structure of the distal end 301 of the bracket body 3 is rectangular with a size of 0.018*0.025~0.022*0.028 inches, and from the mesial end 302 to the distal end 301, a cross section of the hollow structure of the bracket body 3 has a shape gradually changing from circular to rectangular to accommodate a thick square wire commonly used in orthodontics. The segment from a thick round tube of the mesial end 302 to a rectangular tube of the distal end 301 is a slope gradient design, for example, the hollow structure of the bracket body 3 becomes smaller from the mesial end 302 to the distal end 301, and finally becomes a rectangular tube. The above is an example of a double-wing spacing adjustable bracket structure. If a single-wing bracket structure is used, the cross sections of the hollow structures at the mesial end and the distal end are both rectangular and have the same size.

In one of the embodiments of the present disclosure, an outer wall of the position-limited member 4 is provided with a first scale mark 403 along a circumferential direction, and/or, an outer wall of the bracket body 3 is provided with a second scale mark along an axial direction. In this embodiment, in order to facilitate the observation of the position-limited member 4, it can be characterized by the first scale mark 403 and/or the second scale mark, so as to estimate a tightening degree of the bracket body 3. A doctor can guide a patient to appropriately adjust the position of the position-limited member 4 at different stages of orthodontic treatment to realize a proper force for teeth movement.

Figure 2:
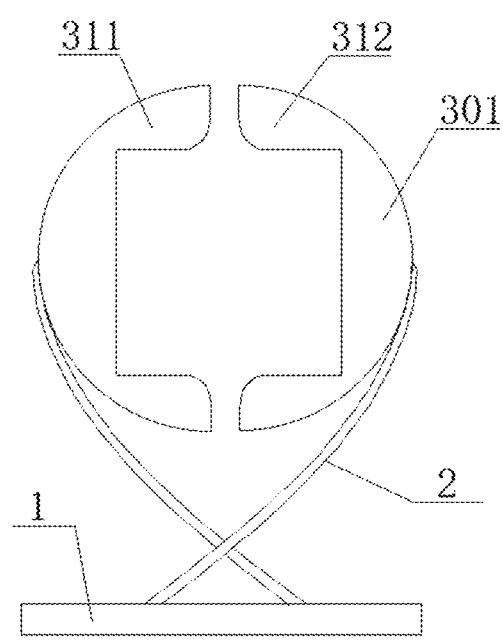
FIG. 2 is a cross-section view of the distal end of a bracket base plate provided by the present disclosure.
Figure 3:
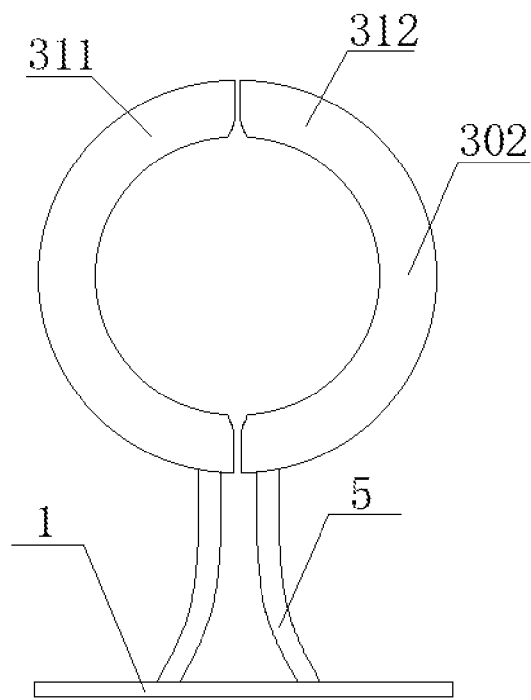
FIG. 3 is a cross-section view of the mesial end of a bracket base plate provided by the present disclosure.
Figure 4:
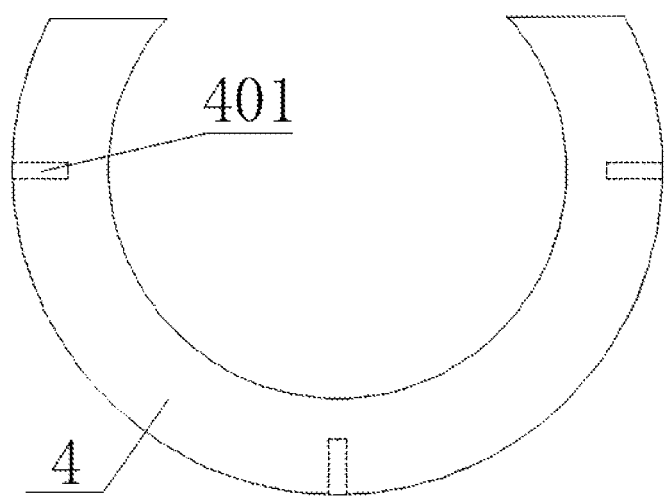
FIG. 4 is a cross-section view of a position-limited member provided by the present disclosure.

In one of the embodiments of the present disclosure, as shown in FIG. 4, for example, the position-limited member 4 is a C-shaped structure, and the outer wall of the position-limited member 4 has a rough surface and/or a plurality of holes 401 provided for insertions of needle-like tools for adjustment. In this embodiment, the C-shaped structure is a circular structure with an opening formed on the upper part. To facilitate the C-shaped structure of the position-limited member 4 to be inserted from the second end of the second elastic support 5 and sleeved on the bracket body 3, in an example, the first end of the second elastic support 5 could be designed as a splay-shaped structure, and the second end of the second elastic support 5 could be a parallel vertical structure. As shown in FIG. 3, the two branches of the second elastic support 5 are connected to the first platform body 311 and the second platform body 312 respectively. After the position-limited member 4 is installed at the mesial end 302, the opening of the C-shaped structure towards labial in order to insert corrective arch wire into the hollow structure of the bracket body 3 through the position-limited member 4. The first elastic support 2 could be arranged as a cross structure or a X-shaped structure (one of the examples is shown in FIG. 2), while the two branches of the first elastic support 2 are connected to the first platform body 311 and the second platform body 312 respectively. When the position-limited member 4 is sleeved on the bracket body 3 from the mesial end 302, the opening of the C-shaped structure can pass through the parallel structure of the second elastic support 5, and be blocked by the first elastic support 2 when it moves to the distal end 301 to avoid a disengagement of the position-limited member 4 from the distal end 301. The cross or X-shape structure of the first elastic support 2 and the splay-shaped structure of the second elastic support 5 extend the length of the two supports and further enhance the buffering effect. In order to facilitate patients to adjust the position-limited member 4 by themselves, the outer wall of the position-limited member 4 is provided with a rough surface with stripes and the like, which increases friction and facilitates rotation. It is also possible to use a special tool to insert the slender hole 401 on the outer wall, and by using the tool, the position-limited member 4 can be rotated.

In addition, as shown in FIG. 2 and FIG. 3, the bracket body 3 has an arc portion near the hollow structure to allow the corrective arch wire to enter the hollow structure.

Figure 5:
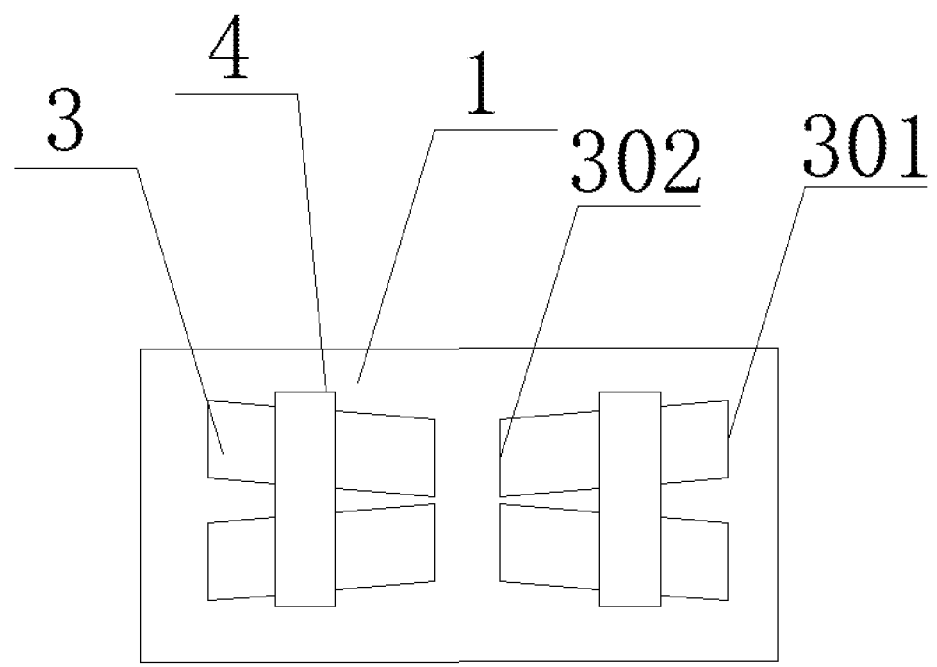
FIG. 5 is a top view of a double-wing spacing adjustable bracket provided by the present disclosure.
Figure 6:
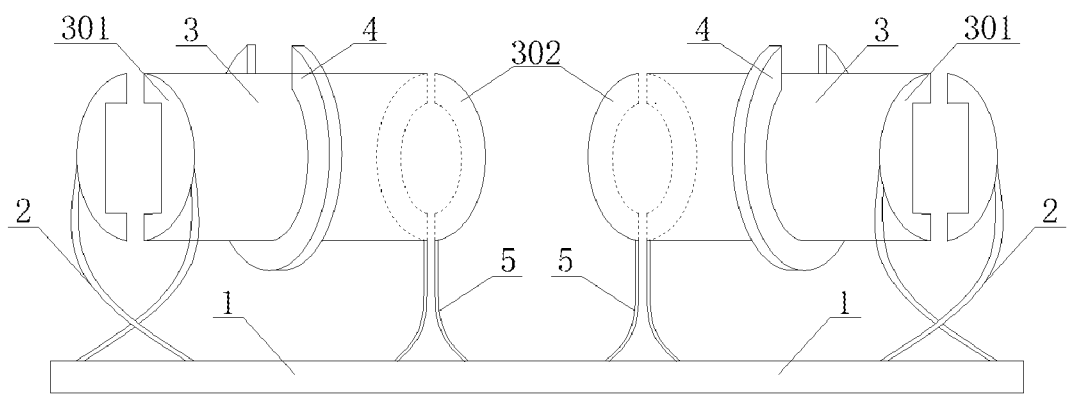
FIG. 6 is a structural view of a double-wing spacing adjustable bracket provided by the present disclosure.

As shown in FIG. 5 and FIG. 6, the present disclosure further provides a double-wing spacing adjustable bracket, including two self-ligating brackets provided by the present disclosure, and the two self-ligating brackets are axially and correspondingly arranged on a tooth.

In an embodiment, the double-wing spacing adjustable bracket in this embodiment is composed of two self-ligating brackets. During an adjustment process, the position-limited members 4 of the two self-ligating brackets can be adjusted simultaneously to form a double-wing spacing adjustable bracket structure. It is also possible to fixate the position-limited member 4 on one of the two self-ligating brackets at the mesial end 302, while the C-shaped opening is facing the labial gap, and only the position-limited member 4 of another self-ligating bracket is adjusted to form a single-wing bracket structure.

It should be noted that the double-wing spacing adjustable bracket provided by this embodiment is to bond two self-ligating brackets on one tooth to accommodate corrective arch wire. And the self-ligating bracket provided by the above embodiments can also be used alone (namely a single-wing bracket), for example, a tooth is bonded with one self-ligating bracket to accommodate corrective arch wire. The single-wing bracket or double-wing spacing adjustable bracket mentioned above can be selected accordingly by orthodontic needs.

In addition, it should be noted that the "wing" in the "double-wing spacing adjustable bracket" provided by the present disclosure have been replaced by "position-limited member", and the "wing" in the present disclosure actually refer to the "wing" in the ligating type orthodontic appliance in terms of mechanical performance, but there is no entity structure of the "wing". The present disclosure is intended to show that the spacing between the "wing" is adjustable, and the use of "wing" is also easier to be understood and expressed by those of ordinary skill in the art.

The present disclosure provides a double-wing spacing adjustable bracket. The critical contact angle between the bracket slot and the arch wire is adjustable in a labiolingual direction and a occlusogingival direction, and the friction force and the torsion force can be adjusted accordingly, which can reduce the number of subsequent visits and improve the correction efficiency.

The present disclosure further provides a dental appliance, including: a corrective arch wire, and a plurality of self-ligating brackets provided by the present disclosure or double-wing spacing adjustable brackets provided by the present disclosure, and the corrective arch wire sequentially passes through interiors of adjacent bracket bodies 3.

In an embodiment, the dental appliance provided by this embodiment has two arrangement forms as follows.

For example, a double-wing spacing adjustable bracket structure is used. For example, two self-ligating brackets are bonded on each tooth. The corrective arch wire passes through the adjacent bracket bodies 3, and the clearance angle is adjusted by the position-limited member 4. If the position-limited member 4 on one of the double-wing spacing adjustable bracket structures is fixated, it can also be called a single-wing bracket structure. The adjustment range of the critical contact angle of the double-wing spacing adjustable bracket structure is more accurate, and the fixation of the corrective arch wire more stable.

For another example, according to actual situation of patients, the single-wing bracket structure can also be used. For example, one self-ligating bracket is bonded on each tooth. The corrective arch wire passes through the adjacent bracket bodies 3, and the critical contact angle is adjusted by the position-limited member 4. When it is designed as a single-wing bracket, the inner diameter of the mesial end is modified to a rectangular slot with the same inner diameter as the distal end, and the unilateral bracket is suitable for narrower lower incisors. The corrective arch wire can be a round wire or a square wire according to different stages of orthodontic treatment, and can also be a nickel-titanium wire or a stainless steel wire.

Finally, it should be noted that the above embodiments are only used to illustrate the solutions of the present disclosure, rather than limiting the solutions. Although the present disclosure is described in detail with reference to the above embodiments, those of ordinary skill in the art should understand that: they may still modify the solutions recorded in the above embodiments, or make equivalent replacements to some of the features; these modifications or replacements do not make the essence of the corresponding solutions depart from the scope of the solutions of various embodiments of the present disclosure.

What is claimed is:

1. A self-ligating bracket, comprising:
a bracket base plate;
a first elastic support, wherein a first end of the first elastic support is connected to the bracket base plate;
a bracket body, wherein the bracket body has a hollow structure, a second end of the first elastic support is connected to a distal end of the bracket body, and the distal end of the bracket body is provided with a distal-end gap and the distal end of the bracket body is expanded radially by the second end of the first elastic support; and
a position-limited member, wherein the position-limited member is movable in an axial direction of the bracket body, and the position-limited member is sleeved on an outside of the bracket body for overcoming elastic force provided by the first elastic support and making the bracket body contract in a radial direction;
wherein the position-limited member is a threaded member, the outside of the bracket body is provided with an axial external thread, the threaded member is provided with an internal thread matching with the external thread, and the threaded member is engaged with the bracket body through the internal thread and the external thread.

2. The self-ligating bracket according to claim 1, wherein the bracket body comprises a first platform body and a second platform body which are symmetrically and correspondingly arranged, the first platform body and the second platform body are supported and separated from each other by the first elastic support to form a round platform structure, and the distal-end gap is formed between the first platform body and the second platform body.

3. The self-ligating bracket according to claim 2, further comprising a second elastic support, wherein a first end of the second elastic support is connected to the bracket base plate, and a second end of the second elastic support is provided to support a mesial end of the bracket body and to separate the first platform body and the second platform body in a radial direction at the mesial end to form a mesial-end gap for insertion of a corrective arch wire.

4. The self-ligating bracket according to claim 3, wherein the first elastic support is a cross structure, the first end of the second elastic support is a splay-shaped structure, and the second end of the second elastic support is a parallel structure.

5. The self-ligating bracket according to claim 1, wherein a cross section of the hollow structure at the mesial end of the bracket body is circular, a cross section of the hollow structure at the distal end of the bracket body is rectangular, and from the mesial end to the distal end of the bracket body, a cross section of the hollow structure has a shape gradually changing from circular to rectangular.

6. The self-ligating bracket according to claim 1, wherein an outer wall of the position-limited member is provided with a first scale mark along a circumferential direction.

7. The self-ligating bracket according to claim 1, wherein the position-limited member is a C-shaped structure, and an outer wall of the position-limited member has a rough surface and/or holes for insertion of a needle-like tool.

8. A double-wing spacing adjustable bracket, comprising: two self-ligating brackets according to claim 1, wherein the two self-ligating brackets are axially and correspondingly arranged.

9. A dental appliance, comprising: a corrective arch wire and a plurality of self-ligating brackets according to claim 1, the corrective arch wire sequentially passing through interiors of adjacent bracket bodies.

\* \* \* \* \*